United States Patent

[11] 3,559,599

[72] Inventor Alfred D. Hoadley
 Napoleon, Ohio
[21] Appl. No. 781,911
[22] Filed Dec. 6, 1968
[45] Patented Feb. 2, 1971
[73] Assignee Campbell Soup Company
 Camden, N.J.
 a corporation of New Jersey

[54] MACHINE FOR PLANTING AND SEALING FURROW WITH TRANSPARENT MATERIAL
 12 Claims, 6 Drawing Figs.
[52] U.S. Cl. ................................................. 111/1,
 111/3, 47/9, 111/85, 47/26, 172/701
[51] Int. Cl. .................................................. A01g 13/02,
 A01c 7/18
[50] Field of Search ........................................ 111/1, 6, 7,
 85, Methods, Furrow Planting; 47/1, 9, 26;
 172/123, 701

[56] References Cited
 UNITED STATES PATENTS
 2,078,872 4/1937 Pfeiffer ........................... 47/9
 3,180,290 4/1965 Kappelmann et al ........... 111/85
 3,293,797 12/1966 Kappelmann et al ........... 47/9
 3,353,297 11/1967 Gervais ........................... 47/9

Primary Examiner—Robert E. Bagwill
Attorney—Howson & Howson

ABSTRACT: A field-cultivating machine which while moving across a field forms a selectively shaped furrow in the soil, prepares the soil for planting, plants seeds or seedlings in the furrow, and then forms a closed chamber by sealing a strip of plastic film over the top of the furrow and into the soil along both sides which by limiting temperature range in the furrow, promotes seed germination and accelerates plant growth. The machine is drawn by a tractor and includes a plow and furrow-shaping structure which support the sides of the furrow while planting and sealing are completed. The soil is prepared by devices which introduce fertilizer, water, insecticide and herbicide into the furrow and then the seeds or seedlings are planted in the bottom of the furrow. A strip of translucent plastic film is continuously laid and supported over the furrow by at least one surface while the edges of the film are pressed into preformed grooves extending along the sides of the furrow. Soil discs place soil on the film edges while they are held in the grooves and packing wheels press the soil firmly against the film sealing the edges. Shaped slits are mechanically made in the film at intervals over the furrow to allow ingress of water and a limited exchange of air.

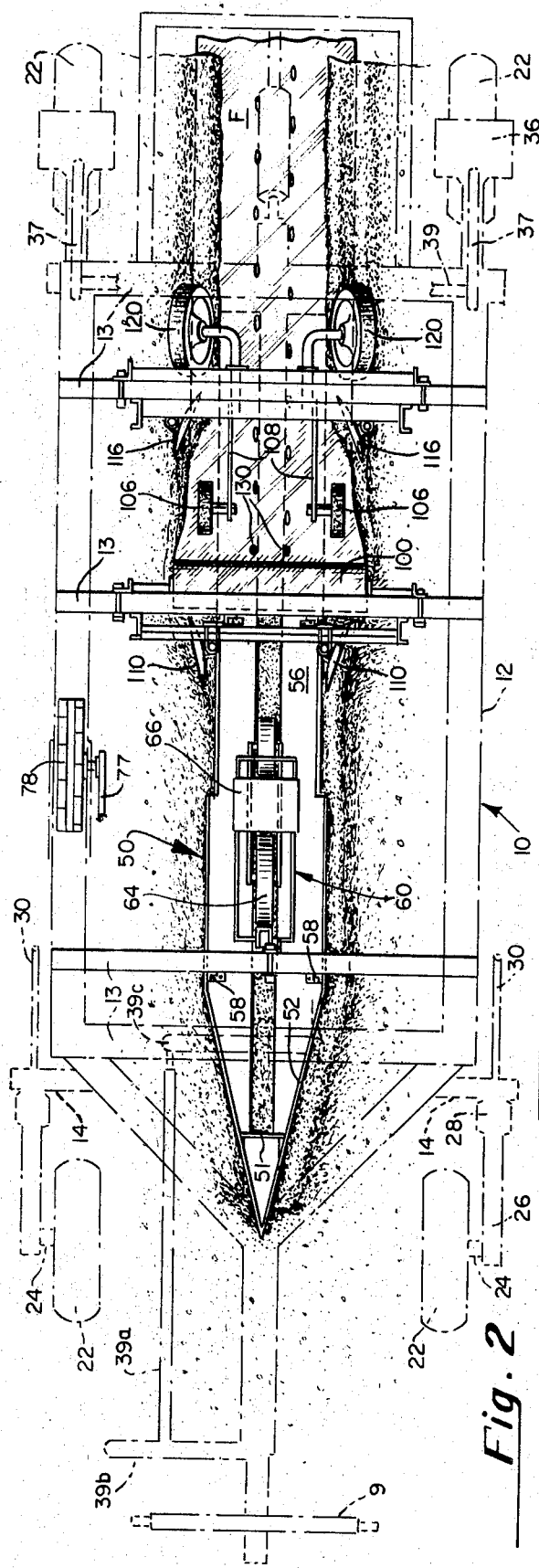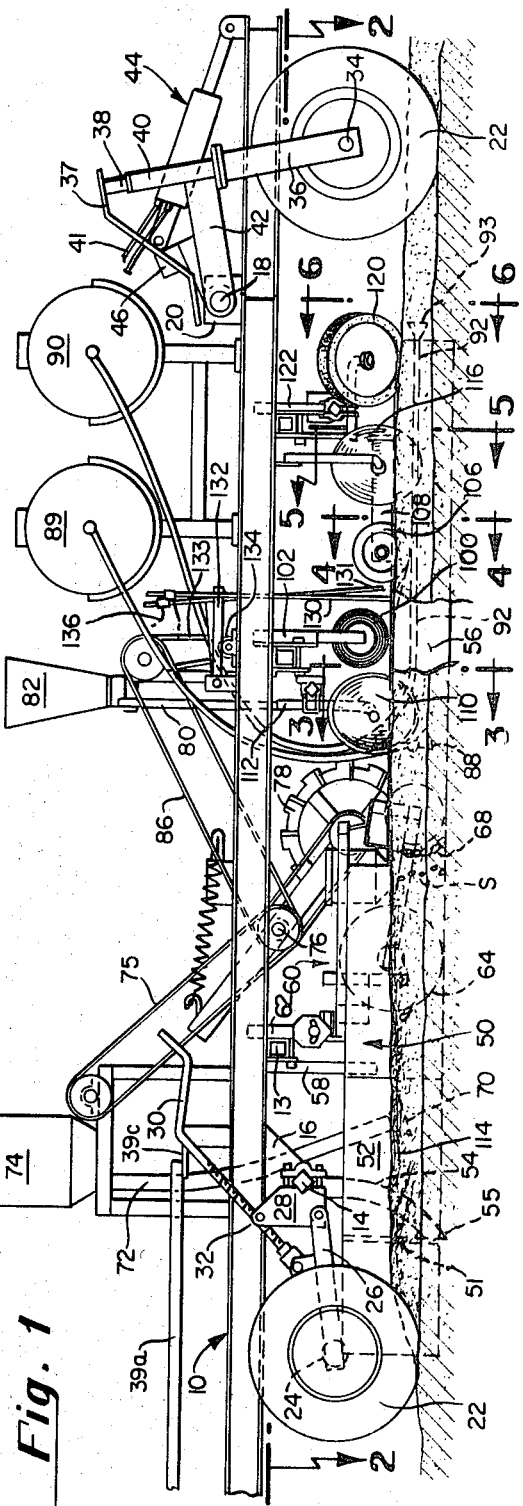
INVENTOR.
Alfred D. Hoadley

MACHINE FOR PLANTING AND SEALING FURROW WITH TRANSPARENT MATERIAL

This invention relates to an apparatus and method for creating a plurality of plant growth chambers in an ordinary field in which the temperature is substantially regulated for the purpose of promoting seed germination and plant growth for an initial critical growth period. In greater detail, this invention teaches the advantages of use of translucent mulch such as plastic film to seal the top of field furrows, which during the same operation, are formed, prepared for seeding and planted for the purpose of enhancing plant growth by eliminating seed and plant injury caused by frost and other harsh weather conditions.

PRIOR ART

The use of mulches composed of various materials to promote plant growth has been known in the industry for many years. Although sometimes finding special use in protecting grown shrubbery from winds or delicate plants such as tobacco from the sun's rays, mulches are more generally placed directly on the ground. Used in this way mulch retards weed growth around the cultivated plant, conserves moisture in the soil and tends to store heat in the soil. Heavy mulch can be used to support seedlings in the proper position when planted by hand or machine such as in the case of pineapple slips. Mulches may be formed, for example, from leaves, paper, cotton fabrics, canvas and lately polyethylene plastic film and as they are normally employed to suppress weed growth, they are opaque to prevent passage of sunlight. Machines for automatically feeding and placing mulches on the ground for the purposes described have been available for many years and, as an example, reference is made to U.S. Pat. No. 1,436,139 to L. E. Bailey and No. 1,471,796 to N. B McGuire et al. In most instances where mulch is used, the soil is flattened and smoothed to receive the mulch and may even be shaped to have a transverse, convex surface as shown in U.S. Pat. No. 3,184,889 to C. E. Gray et al. It is clear, however, that the use of mulch in this manner promotes plant growth by retarding weeds by covering soil adjacent the plant and by conserving moisture in the soil but does nothing to protect the seed or seedlings from adverse weather conditions. When mulch is placed on the ground, seeds or seedlings are planted through the mulch into the soil allowing weather to reach the seed and surrounding soil and the mulch offers no protection once the plant rises from the ground.

Some attempts have been made to use mulch to protect seedlings by covering the plants after they germinate and rise above the level of the soil. In U.S. Pat. No. 2,078,872 to A. Pfieffer arched paper is placed on the ground over the plants. Similarly, in U.S. Pat. No. 3,352,297 to A. C. Gervais, a transparent plastic is placed over a row of plants by forming a pair of soil banks on both sides of the row higher than the plants and placing the film on these banks. Although the Pfeiffer apparatus protects rows of plants against adverse weather conditions, it prevents growth by being impervious to the sun's rays. The Gervais apparatus assumes a row of plants and is limited to those field conditions which allow soil to be scraped into banks after planting has occurred. Further, Gervais does not show means for initially preparing a furrow within the soil, preparing the soil, planting seed and then sealing the furrow to form a temperature controlled chamber in which seed can more quickly germinate and develop.

Therefore, it is the primary object of this invention to provide a field growth chamber of the character described which, by limiting the weather extremes, extends the effective growing season by permitting both seeds to be planted about one month earlier in the spring in northern areas of this country. Early planting results in earlier harvesting which, in turn, offers several specific benefits including more efficient mechanical harvesting, large yields, reduced costs, and other efficiencies.

Mechanical harvesting is made more efficient because the plants and the fruit, such as tomatoes, mature earlier in the late summer, thus permitting the farmer to delay the harvest until the optimum quantity of fruit matures in each field without risking frost damage due to late harvesting. Similarly, because the crop matures earlier, manual harvesting can be used more efficiently when it is combined with mechanical harvesting or used as the sole means of collecting the crop.

Larger yields are possible because the extended growing season offers greater plant population by allowing fruit to be grown from inexpensive seeds which are sown in larger quantity than are planted seedlings per acre.

Similarly, the cost of transplanting seedlings may be reduced or even eliminated as a large crop may be safely grown from seeds and harvested at an earlier time in the summer. The above outlined advantages find specific application in the tomato crop planting in northern states where seed planting may be advanced about one month in the spring but the invention has valuable utility in southern states by allowing two growing seasons.

It is a further object of this invention to provide a workable and economical apparatus and process which in a single pass across an unprepared field will form and shape one or more furrows of suitable depth and shape, prepare the soil for planting and introduce water, fertilizer and similar conditioners, plant seeds and then effectively lay and seal in the soil a transparent plastic mulch across the top of the furrow which will protect the seeds against frost and other harsh weather conditions and promote their germination and development.

In summary, this invention teaches apparatus and method for protecting seeds during germination and initial growth period right in the field at highly economical cost by combining in a single machine the functions of forming a suitable furrow, preparing the soil in the furrow for maximum growth, planting seeds and then sealing the furrow to form a chamber wherein a relatively high temperature is maintained by allowing the sun's rays to heat the soil and air within the chamber and preventing cold air from entering the chamber. The apparatus of this invention discloses highly efficient means for sealing the furrow covering, translucent mulch in the soil so that neither high winds nor heavy rains can remove it until the season has progressed and the chamber is no longer necessary. Further, by means of shaped perforations in the film, rain water passes into the soil while moisture evaporating from the soil is condensed on the inside of the film and drops again into the soil.

In greater detail, the preferred process of this invention includes the steps of forming a shaped furrow in an unprepared field suitable for the nature of the plant and the type of soil, planting the seed in the furrow while enhancing the soil by fertilizer, water and the like, feeding a transparent mulch across the furrow, creating a pair of grooves parallel to and adjacent the top edge of the furrow, installing the side edges of the film in the grooves, laterally moving and packing the soil into the grooves to lock and seal the film edges while supporting the film across the furrow to prevent lateral movement which would displace the film and pull down the soil into the furrow. And, finally, slitting the film at desired locations to allow rain water and limited amounts of air to pass through into the chamber created.

Although the apparatus and process of this invention may assume several embodiments, the preferred form as it is now in use is described below and shown in the drawings, which are made a part hereof by reference, wherein:

FIG. 1 is a side elevational view of one form of the apparatus of this invention;

FIG. 2 is a sectional view from above taken along the lines and arrows 2—2 of FIG. 1 with additional structure shown in broken lines.

Figure 3:
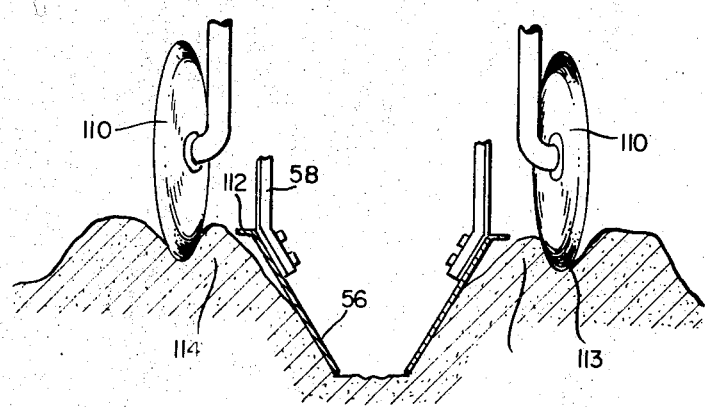
FIGS. 3—6 are sectional views of the apparatus shown in FIG. 1 looking forward and taken at selected locations as indicated by the lines and arrows in FIG. 1.

The preferred form of the apparatus of this invention comprises a movable vehicle which in the present instance is mounted on four wheels 22 in the corners and drawn in one direction by a tractor not shown by means of a standard tractor hitch 9 shown in broken lines at the left end of the vehicle in FIG. 2. The vehicle is generally constructed with a supporting frame 10 approximately 8 feet wide and 12 feet long composed of generally rectangularly joined longitudinal beams 12 and crossbeams 13 which support specialized apparatus therebeneath. The frame 10 is supported in the front by crossbeam 14 fixedly mounted in brackets 16 and in the rear by crossbeam 18 mounted for limited rotation in brackets 20. Four wheels 22 support and are joined to the two beams by separate apparatus which permits the frame, in the rear, to be raised or lowered in relation to the ground and, in the front, permits the furrow-shaping structure to be vertically positioned to form a furrow of desired depth and size. The front end of the frame is lifted for general purposes at the hitch 9 by standard apparatus mounted on the tractor not shown.

In front, the two wheels 22 are each mounted on a hub 24 in an arm 26 which is pivotally joined to yoke 28 fixedly attached to crossbeam 14. A threaded crank 30 threads through a pivoting nut 32 (not shown) mounted in yoke 28 and is pivotally attached to arm 26 to control the position of arm 26 about its pivoted connection with yoke 28. Clockwise rotation of crank 30 causes arm 26 to pivot downwardly in relation to yoke 28 thereby raising beam 14, frame 10 and, particularly, plow 52 and furrow structure 56 in relation to the soil. Of course, the same assembly is found on the opposing front side of the vehicle.

The rear wheels 22 are mounted differently and controlled by hydraulic pressure operated from the drawing tractor. By means of the hydraulically controlled rear end of the vehicle and the lifting of the front end through hitch 9, the frame and attached apparatus can be quickly lifted clear of the soil so that the vehicle can be readily transported or positioned in a field to form a new furrow. Each rear wheel 22 is mounted on a hub 34 in a yoke 36 which becomes extended as steering shaft 38, which is supported for limited rotation in collar 40. Collar 40 is attached to a bracket 42 which is attached to crossbeam 18 mounted in brackets 20. A standard hydraulic piston assembly 44 pivotally mounted on the frame at one end and attached to bracket 46 on the other and therethrough to beam 18 controls rotary movement of beam 18 and, through bracket 42 and yoke 36 on each side of the vehicle, raises and lowers the frame 10 in relation to the ground. The hydraulic assembly 44 is powered by a source of hydraulic pressure on the tractor (not shown) which passes through hoses 41 partially shown in the rear of the vehicle.

Steering of the vehicle is accomplished by slight turning of the rear wheel by means of connecting steering links extending rearwardly from the tractor to a common transverse arm 39 (FIG. 2) which controls shafts 38 attached to each rear wheel through links 37. In detail rear wheel shafts 38 are controlled by links 37 which are attached to transverse steering arm 39 which in turn is pivotally attached to a series of links not shown extending forward to links 39a and 39c and pivotally mounted bar 39b. Bar 39b is controlled by the driver of the tractor by suitable power means not shown but familiar in the industry.

A furrow forming apparatus, generally indicated by the numeral 50, is rigidly suspended beneath the frame 10 to plow and shape the furrow in which seed are later planted. The apparatus includes a wedge shaped plow 52 the sides of which are pointed towards the front and inclined inwardly at the bottom and which is rigidly supported from the frame by a curved brace 54 (FIG. 1) attached to transverse plow support 51. The particular apparatus, shape and employment shown and described herein have been successfully used to plant tomato seeds in the field chambers and the dimensions given are directed to that specific application and it should be understood that the depth and shape of the furrow will vary depending upon the soil, nature of plant and other considerations. In this embodiment the plow 52 is positioned so that approximately 4 inches of its bottom surface enters the soil and as the frame advances, soil mounds 114 are formed rising about 3 inches above the level of the field as shown best in the sectional view in FIGS. 3—6. This forms a furrow having about 7 inches in total depth. Connected to the plow and extending rearwardly for the length of the vehicle is the furrow shaping structure 56 having flat downwardly and inwardly sloping sides, a substantially V-shaped cross section and a bottom opening between the inclined sides of about 3 inches and a top opening of about 14 inches, the angle of inclination of the sides being determined by the type of soil. In heavy soils the sides may be of greater inclination because the earth holds its position after planting and sealing but in the lighter or sandy soils a lesser inclination is required. Structure 56 is rigidly suspended from the frame by a series of vertically arranged angle irons 58 (only one of which is shown in FIG. 1 for simplicity) and the rear portion of the structure includes a pair of flat, horizontal surfaces 112 (FIGS. 3—6) located along the top of the structure which serve to support the mulch during the sealing operation as described below. It is readily apparent that movement of the plow 52 and furrow shaping structure 56 across a field (to the left as shown in FIGS. 1 and 2) creates a continuous excavation in the soil which is of sufficient depth and width to allow seeds to grow for an initial development period still totally below the surface of the field. The structure 56 shapes and maintains the position of the furrow sides while the various steps are accomplished and does not release the walls until the last step of compressing the soil on the film is completed. Although the term "furrow" is used extensively in the specification to describe the excavation formed in the soil, it is not intended to limit the invention to a particular type or shape of soil chamber. For example, the depth and width of the furrow or soil chamber will depend to some extent upon the type of soil and also upon the seed planted and the expectant rate of growth. The apparatus and furrow size shown herein as one embodiment of the invention has proved satisfactory for planting tomato seeds early in the Spring in the relatively heavy soil of northern Ohio.

After the furrow has been basically formed, various apparatus are employed to prepare the soil in the bottom of the furrow for planting. In this embodiment, apparatus suitable for preparing the soil and for planting tomato seeds is disclosed but such is merely representative of the apparatus which may operate in the machine disclosed for similar purposes.

The soil at the bottom of the furrow is initially loosened by a protruding point 55 of support 54 which penetrates the soil only an inch or so. After the soil is loosened, fertilizer is sprayed from nozzle 70 through hose 72 from reservoir 74 mounted on the frame. Rate of feed of the fertilizer is controlled by rotation of ground wheel 78 conveyed through belt 77, transverse shaft 76 and belt 75 to the reservoir 74 as shown in FIG. 1.

A seeder generally designated by the numeral 60 and shown in FIGS. 1 and 2, is suspended from the frame by adjustable members 62 and, in this instance, is positioned about 2 feet behind the leading point of the plow but substantially within the structure 56. The device shown is well known in the industry as a Planet Jr. planter manufactured by the L. S. Allen Company, Inc. of Philadelphia. Described generally, the planter operates by a ground driven wheel 64 causing attached levers (not shown) to drop seeds S from a receptacle 66 in the soil at desired intervals. A short piece of chain 68 drags over the seeds covering them with soil.

Water is sprayed on the seeds through nozzle 88 from a tank 89 at a predetermined rate. Insecticide granules are dispersed into the furrow from a conduit 80 from a reservoir 82 and the rate metered by belt 86 from the ground wheel 78. The granules are intended to kill insects which are present in or which may later gain access to the furrow. Finally, a herbicide to destroy weeds is sprayed over the soil in the furrow through a nozzle 93 along conduit 92 from a tank 90 similarly mounted on the frame.

The preferred form of the mulch supply and mulch laying apparatus of this invention will now be described. In the embodiment disclosed, it has been found advantageous to employ a polyethylene plastic film as a specific type of mulch but other translucent or transparent, generally impervious materials of low cost would find suitable application. A roll of plastic film 100 having a width of about 25 inches and a diameter of about 9 inches is suspended for free rotation transverse to the longitudinal axis of the vehicle on a pair of adjustable stanchions 102 just above the top of the furrow. In this embodiment, the film F is pulled from the roll by the film itself being continuously sealed in the soil as the vehicle progresses. For bulkier mulches, the roll may be powered to provide an even flow without undue stresses being created on the film. A particular type of film found satisfactory is marketed under the name of Vita-Film, manufactured by Goodyear Tire & Rubber Company, having a gauge of 95—100 or thickness of 0.75—1 M. The location of the film roll in relation to the ground may be varied according to the height of the soil mounds formed along the sides of the furrow but it has been found advantageous to mount the source of film or mulch as close as possible to the ground and avoid the necessity of additional roller means to feed the film over the furrow.

Figure 4:
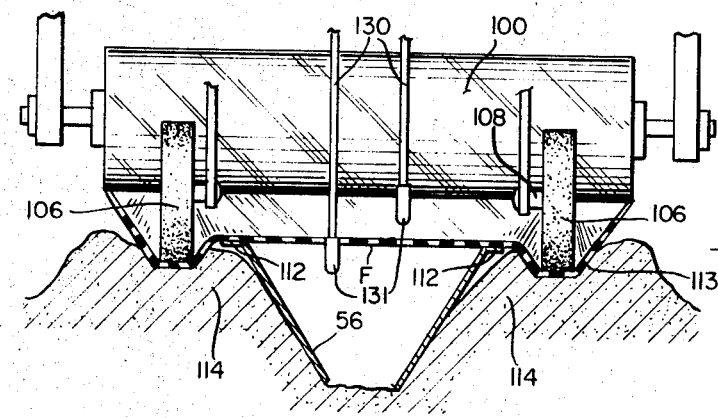
Figure 5:
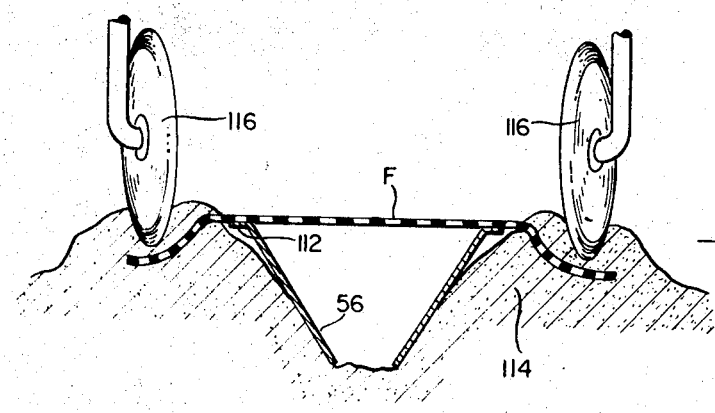
Figure 6:
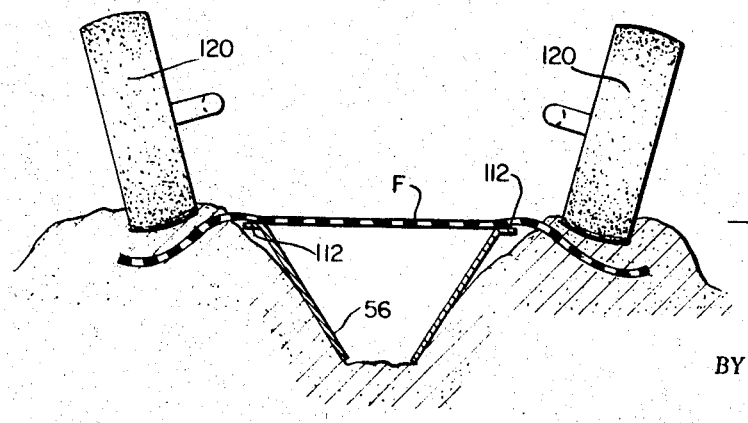

To prepare the earth to receive the film, a pair of standard field discs 110 each mounted on vertical bar 112 are positioned in the soil outside of furrow-shaping structure 56 (FIG. 3) to form a pair of parallel grooves in the soil mounds about 2 inches from each side of the furrow. The discs 110 are outwardly directed from the longitudinal axis of the vehicle to penetrate the soil to a depth of about 3 inches and displace soil outwardly to form a pair of grooves 113 about 2 inches in width and 3 inches in depth along and parallel to each side of the furrow. Of course, the grooves can be of different dimension and location than that described. A pair of film wheels 106 supported for free rotation in the horizontal stanchions 108 are positioned to advance within the grooves 113 and press the extreme edges of the film into these grooves, the film itself being pulled downwardly into the grooves over the horizontal supporting surfaces 112 of the structure 56 as shown in FIG. 4 which are located adjacent the highest level of the soil mounds 114. This pair of surfaces form the enlarged top edges of structure 56 and extend rearwardly to continually support the film while the various film sealing steps are occurring. Tension is normally expected to be created on the film in a transverse direction by the pull of wheels 106 and in the longitudinal direction by force exerted by that film portion already secured in the soil. Surfaces 112 support the film F substantially parallel to the base of the furrow and at the same level as the top of the soil mounds 114 on the furrow sides while the film is pressed in both grooves 113 and subsequently sealed in the soil. Further, surfaces 112 prevent the film from pulling down the earth mounds 114 into the furrow, provide support when the mounds are broken or formed of clods, and act to prevent the film from being pulled out of the earth as the vehicle slightly changes direction. The surfaces 112 extend rearwardly to support the film until each of three soil rendering operations are completed and the film is sealed in the soil as shown in FIGS. 3—6. As a modification of the supports 112, a transverse bar or surface extending across the furrow from the opposing sides of structure 56 and positioned immediately behind the film supply 100 would effectively support the film as it was pressed into the soil.

Located immediately behind the film wheels 106 are a second pair of inwardly directed soil discs 116 which penetrate the soil of the mounds to a depth similar to that of forward discs 110 and thereby displace soil laterally onto the edges of the mulch film while said edges are held down in grooves 113 by wheels 106. The light gauge of the film allows it to be crinkled and deformed by the soil particles pressed against and into it thus increasing its retention in the soil. More than one pair of soil discs 116 may be used to more effectively displace the soil against the film in the groove as described.

Mounted for free rotation along the surface of the earth mounds behind the soil discs 116 are a pair of inclined soil press wheels 120 adjustably mounted in supports 122. The wheels 120 rotate and advance along the outside surface of the soil mounds and pack the soil thrown inwardly by the discs 116 against and on top of the edges of the plastic film. When the film is finally released by surfaces 112, the pressed earth on opposing top surfaces of the furrow mounds is quite sufficient to support the film across the open furrow even when object weighing several pounds are placed on it. It has been observed that as the weather hardens the soil, the mulch becomes locked in so tightly that it will rip before it is pulled loose from the furrow mounds.

It has been found advantageous to place small holes or shaped slits at regularly spaced intervals along the center section of the mulch as it covers the furrow to allow rain water to pass through to the plants and to allow a limited exchange of air. For this purpose, a pair of copper rods 130 with electrically heated tips 131 are mounted for limited vertical movement in relation to the film adjacent the film roll on arms 132 which in turn are pivotally mounted on the frame and actuated by cams 134. The cams 134 are rotated by ground wheel 78 and connecting belts 86 and 133 so that as the vehicle advances the cams are rotated to cause rods 130 to periodically lift and descend. As the tips 131 of the rods 130 are electrically heated by current passing along wires 136 from a source, such as a generator not shown but mounted on the rear of the frame 10, longitudinal slits are formed in the film as it advances from the supply 100. In the preferred form, the slits measure about ¼ inches in width and 2 inches in length and are located about 5 inches apart so that sufficient openings are provided for rain water to flow into the furrow chamber even during heavy rain. It has also been found advantageous to cut the film along an arc so that a small flap is formed which readily opens to let water through but closes to prevent flow of air. Of course, mechanical means to slit the film with knives and points are available and preperforated film may be used so that no cutting is required. As a modification, it is found advantageous to initially utilize film with small slits while the weather is cold but then as the season progresses, the slits could be enlarged or made more numerous to provide increased ventilation.

In normal operation, the vehicle is positioned at one end of the field to be cultivated and the end of the mulch is secured in the soil by hand. The vehicle then begins to advance across the field either being pulled or under its own power and automatically creates the furrow, prepares the soil, plants the seed and lays the film sealing it in the soil along the sides of the furrow as described. When the end of the row is reached, the mulch is cut and secured in the soil forming the closed chamber, and the frame 10 is raised by the hydraulic lift on the tractor effecting the front of the vehicle and by the hydraulic assembly at the rear of the vehicle thereby lifting the plow and furrow shaping structure out of the soil. The vehicle is turned by movement of the rear wheels through the steering arms and positioned to form the next furrow. If the depth of the furrow is to be changed, then by rotation of either or both of cranks 30 the position of the plow 52 and structure 56 are varied in relation to the frame and ground. As an obvious variation of the vehicle described, the frame 10 can successfully support a pair of each plows, furrow structure, mulch supply and apparatus for sealing the film similar to the single apparatus shown. With such apparatus the vehicle forms, plants and seals two chambers in the field at the same time.

The mulch film is removed from the chambers when the seedlings are of sufficient size and the season has progressed or the weather tempered to make further environment control unnecessary. Of course the timing depends upon the general weather conditions and location but it has been found generally satisfactory to remove the film in the latter part of May when planting in Ohio. One method for removing the film includes freeing an end of the film from the soil and pulling it longitudinally through a ring which gathers the film into rope form increasing its tensile strength and allowing it to be wound up on a reel. This process can economically be made part of a subsequent early Summer plant cultivation process in which the soil mounds are broken and displaced into the furrow and around the stems of the growing plants. The film itself can be reclaimed for further use or discarded.

It is one of the main advantages of this invention that use of the transparent plastic film does not substantially retard solar energy from passing into the soil and to the seedlings to create a hothouse effect so that the seeds germinate and plants develop earlier and at a faster rate than those unprotected in the field. Similarly, the seeds and plants receive the natural supply of rain water and moisture evaporation from the soil is greatly reduced by the covering film. It is another advantage of this invention that the growing season is effectively extended and risk of loss of crop or plant damage due to frost and other adverse weather conditions is removed. Due to the protection afforded by the field growth chamber as described, tests have shown that tomato seeds may be planted in northern Ohio as early as about Apr. 5th whereas the earliest safe planting time without the chamber was about May 10th. As an example of the effectiveness of the chamber in reducing temperature extremes, after several days of below freezing temperatures above the ground in the early Spring, the temperature in the chambers did not fall below 44° F. even though the days were cloudy. Of course, my invention has equal application to vegetables and fruits other than tomatoes, and other crops such as corn and tobacco. Where the word "seed" is used in this specification and claims, it is understood to include various types of plant material, which are planted in the earth and expected to develop further plant growth and fruit.

Of course, various modifications and changes in the preferred form of the apparatus and method of this invention as shown and described herein will be apparent to a skilled mechanic, but such modifications may be matters of form and convenience and will be within the scope of the appended claims.

I claim:

1. A machine for forming a plant growth chamber along the surface of a field comprising:
    a frame adapted for movement in one direction across the field;
    a plow attached to the frame having a portion located within the soil to form a furrow as the frame moves across the field;
    a furrow-supporting structure extending rearwardly from the plow and attached to the frame, said structure having a pair of inclined sides to substantially maintain the shape of the furrow formed by the plow;
    seed-planting means mounted on the frame for placing seeds in the bottom of the furrow;
    a supply of substantially translucent mulch having a width greater than the width of the top of the furrow and having a length sufficient to extend at least a portion of the length of the furrow, said supply of mulch being mounted on the frame and to the rear of said seed-planting means to continuously lay a mulch strip over the top of the planted furrow as the frame moves across the field;
    means mounted on the frame to the rear of the mulch supply and on both sides of the furrow to press the edges of the mulch onto the opposing shoulders of said furrow;
    means mounted on the frame located substantially level with the top of the furrow and shaped to support said mulch in a substantially taut condition across the furrow as the mulch is pressed onto said furrow shoulders; and
    means mounted on the frame for continuously sealing the opposing edges of the mulch in the soil along the furrow shoulders while said mulch is being supported in said taut condition to form the plant growth chamber.

2. The machine as defined in claim 1 wherein the mulch is provided with a series of spaced apart holes extending generally lengthwise along the center of the mulch so that after the mulch is laid over the top of the furrow the holes permit the ingress of rain through the mulch and into the furrow.

3. The machine as defined in claim 2 further including means mounted on the frame in front of the mulch supply for placing fertilizer in the furrow before the mulch is laid over the top of the furrow.

4. The machine as defined in claim 3 further including means mounted on the frame in front of the mulch supply for placing insecticide in the furrow before the mulch is laid over the top of the furrow.

5. The machine as defined in claim 4 further including means mounted on the frame in front of the mulch supply for placing water in the furrow before the mulch is laid over the top of the furrow.

6. The machine as defined in claim 5 further including means mounted on the frame to the rear of the mulch supply for placing herbicide in the furrow at a location adjacent the rear of the frame and after the mulch is laid over the top of the furrow.

7. The machine as defined in claim 2 wherein the mulch is a transparent plastic film.

8. The machine as defined in claim 2 further including means mounted on the frame in front of the mulch supply to form a pair of grooves in the soil in the opposing shoulders of said furrow, the edges of the mulch being pressed into said grooves as the machine moves across the field.

9. The machine as defined in claim 8 further including means mounted on the frame to the rear of the means for sealing the edges of the mulch in the soil along the furrow shoulders for packing the soil on top of the edges of the mulch and thereby sealing the mulch in the opposing shoulders of the furrow.

10. The machine as defined in claim 9 wherein the means for supporting the mulch in said taut condition comprise a pair of horizontal surfaces mounted on the top of said sides of the furrow-supporting structure, said surfaces extending rearwardly from a location adjacent the mulch supply to a location adjacent the means for packing the soil on the mulch edges.

11. The machine as defined in claim 10 further including a pair of wheels attached to and supporting the front of the frame and a pair of wheels attached to and supporting the rear of the frame above the surface of the field, and means connecting the wheels and the frame to allow the frame to be adjusted in height in relation to the surface of the field to thereby vary the depth of the furrow formed in the field as the frame moves across the field.

12. The machine as defined in claim 11 further including at least one rod having a heated tip for forming spaced apart holes in the mulch, said rod being mounted on the frame to the rear of the mulch supply for generally vertical reciprocating movement in relation to the generally horizontal movement of the mulch so that the rod tip penetrates the mulch at intervals to form spaced apart holes in the mulch laid over the top of the furrow.